(12) United States Patent
Wynn et al.

(10) Patent No.: US 11,984,621 B2
(45) Date of Patent: May 14, 2024

(54) BUSBARS HAVING STAMPED FUSIBLE LINKS

(71) Applicant: Rivian IP Holdings, LLC, Irvine, CA (US)

(72) Inventors: Nathaniel Christopher Wynn, Tustin, CA (US); Kyle William Butterfield, Ladera Ranch, CA (US); Tyler David Collins, Irvine, CA (US); Charles Ed Chang, Coto de Caza, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/222,736

(22) Filed: Jul. 17, 2023

(65) Prior Publication Data
US 2024/0072383 A1    Feb. 29, 2024

Related U.S. Application Data

(63) Continuation of application No. 17/185,693, filed on Feb. 25, 2021, now Pat. No. 11,749,869, which is a (Continued)

(51) Int. Cl.
*H01M 50/00* (2021.01)
*H01M 50/213* (2021.01)
(Continued)

(52) U.S. Cl.
CPC ....... *H01M 50/516* (2021.01); *H01M 50/213* (2021.01); *H01M 50/503* (2021.01)

(58) Field of Classification Search
CPC .......................... H01M 50/552; H01M 50/531
See application file for complete search history.

(56) References Cited

U.S. PATENT DOCUMENTS

| 9,017,858 B2 | 4/2015 | Sasaki et al. |
| 9,385,360 B2 | 7/2016 | Stoughton et al. |

(Continued)

FOREIGN PATENT DOCUMENTS

| CN | 102195022 A | 9/2011 |
| CN | 107078263 A | 8/2017 |

(Continued)

OTHER PUBLICATIONS

International Search Report and Written Opinion received for PCT Patent Application No. PCT/US2019/048021, mailed on Nov. 8, 2019, 9 pages.

*Primary Examiner* — Amanda C. Walke
(74) *Attorney, Agent, or Firm* — HALEY GUILIANO LLP

(57) ABSTRACT

A battery interconnect may include a desired current capacity, integrated fusible links, and be manufacturable using cost effective techniques.

In some embodiments, a battery interconnect includes a busbar and relatively thinner links. A busbar carries larger currents and accordingly its cross-sectional areas are relatively larger to reduce ohmic losses. A link carries a much smaller current, and a fusible link is configured to break the circuit when the current is above a threshold, thus requiring a relatively small cross-sectional area. These sometime disparate length scales are addressed using several techniques such as layering a busbar and a foil sheet and pressing portions of a busbar to form the links. The links can be affixed to a plurality of battery cells to connect the cells in parallel or series.

20 Claims, 11 Drawing Sheets

Related U.S. Application Data continuation of application No. 16/110,811, filed on Aug. 23, 2018, now Pat. No. 10,957,892.

(51) Int. Cl.
*H01M 50/503* (2021.01)
*H01M 50/516* (2021.01)

(56) References Cited

U.S. PATENT DOCUMENTS

| | | |
|---|---|---|
| 2007/0188147 A1 | 8/2007 | Straubel et al. |
| 2008/0259586 A1 | 10/2008 | Hosokawa et al. |
| 2011/0223776 A1 | 9/2011 | Ferber, Jr. |
| 2019/0115704 A1 | 4/2019 | Copperthite et al. |
| 2019/0260005 A1 | 8/2019 | Smith et al. |
| 2019/0312251 A1 | 10/2019 | Matthews |
| 2020/0067060 A1 | 2/2020 | Collins et al. |

FOREIGN PATENT DOCUMENTS

| | | |
|---|---|---|
| CN | 206471393 U | 9/2017 |
| CN | 207353365 U | 5/2018 |
| EP | 2393144 A1 | 12/2011 |
| JP | 2002-151045 A | 5/2002 |
| WO | 2013/080136 A1 | 6/2013 |

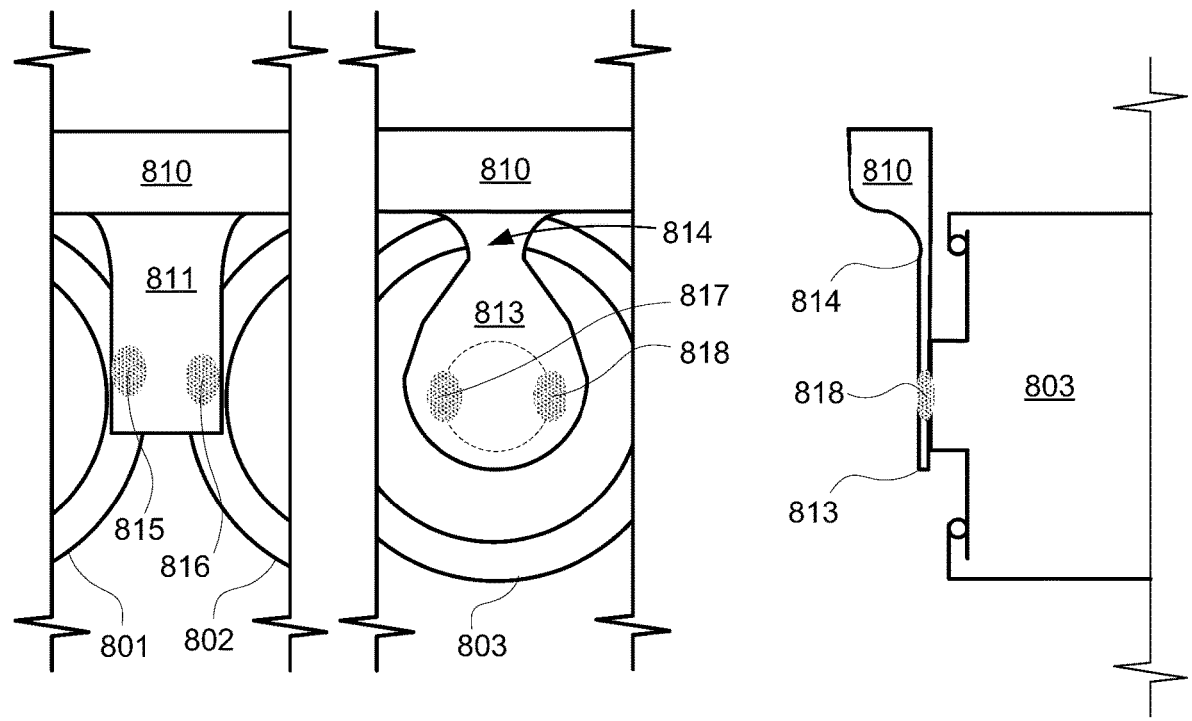
FIG. 8
FIG. 9
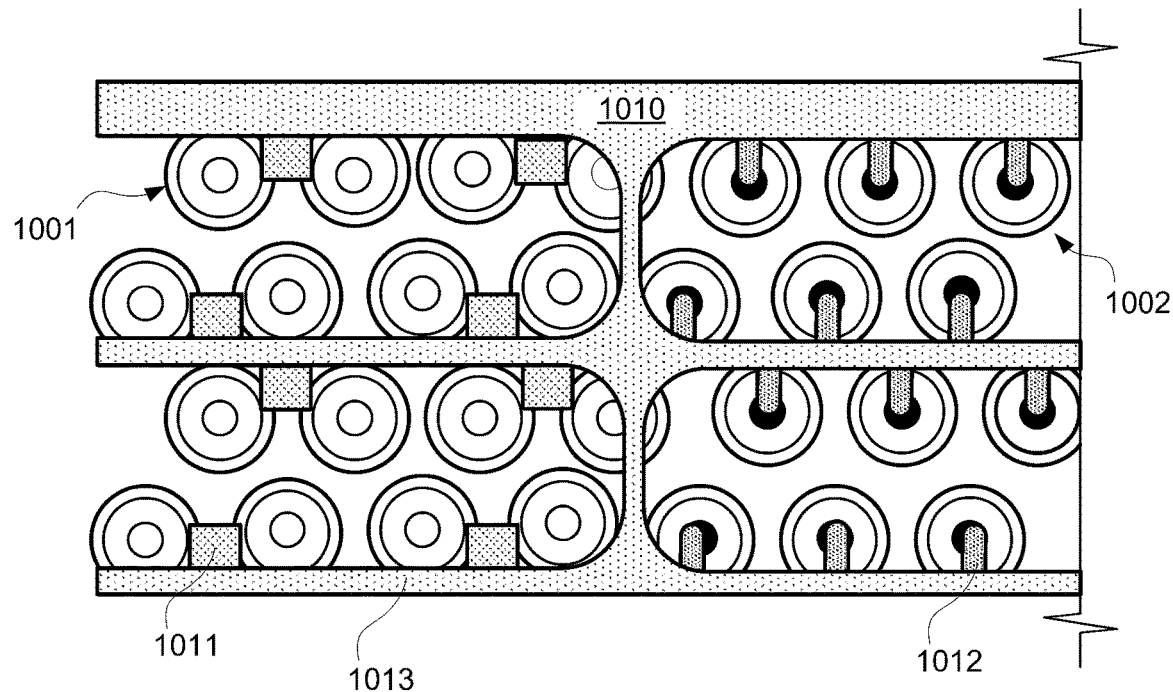
FIG. 10

BUSBARS HAVING STAMPED FUSIBLE LINKS

CROSS-REFERENCE TO RELATED APPLICATIONS

This application is a continuation of U.S. patent application Ser. No. 17/185,693, filed Feb. 25, 2021, which is a continuation of U.S. patent application Ser. No. 16/110,811, filed Aug. 23, 2018, now U.S. Pat. No. 10,957,892, the disclosures of which are hereby incorporated by reference herein in their entireties.

INTRODUCTION

Battery systems typically include many battery cells connected together in a combination of series and parallel connections. In many circumstances, it is important for safety reasons to include a fusible link for as small a group of cells as feasible in an automotive battery pack. In the ideal case, each cell has at least one fusible link. The fusing current is primarily a function of minimum cross-sectional area (i.e., the throat). For example, for Aluminum 1100 to fuse in air at around 40 A in 1 s, a cross section of roughly 0.2 sqmm is required. Accordingly, for a 1 mm thick aluminum busbar to have an appropriate cross section for fusing, the throat needs to be 0.2 mm in width. This is not suitable for any production-scalable manufacturing techniques. For example, a typical minimum ratio between feature width and sheet thickness is on the order of 5:1 for stamping, 3:1 for waterjet or laser cutting, 1:1 for wire EDM, but this geometry would have a ratio of 1:5. It would be advantageous to provide an improved fusible link of desired cross-sectional area.

Typically, busbars are connected to cylindrical lithium ion battery cells using wire-bonding, laser welding, and resistance welding. For example, FIG. 1 shows a wire-bonded connection of battery cell 110 to current collectors 101 and 102. Battery cell 110 has a positive terminal (+) and a negative terminal (−). Wire 111 connects the negative terminal of battery cell 110 to current collector 101, and wire 112 connects the positive terminal of battery cell 110 to current collector 102. Wires 111 and 112 are sized to act as fusible links. Such a connection scheme requires two wires and four bond regions per cell. The busbars connect an array of cells in the desired series and parallel strings. Wire-bonding includes ultrasonically welding a conductive wire to both the cell and the busbar. The length and diameter of the wire can be sized to act as a fuse at a current that is above the normal operating conditions of the cell, thus providing extra safety in the event of over-current and short circuit conditions. One problem with wire-bonding is that when there are a large number of connections to be made in a battery module and pack, it can become a bottleneck in production due to the speed and success rate of the bonds. For example, it may take about one second to perform one connection. Further, the success rate generally ranges from 99 to 99.99%. On a battery pack that has 5000 cells, which need to be connected to positive and negative, that would result in 10000 connections just to the cells and 20000 connections total. This suggests an average of two failures even if a success rate of 99.99% were obtained. It would be advantageous to use a faster, more reliable process to connect cells to a busbar, while maintaining a fusible link.

SUMMARY

In some embodiments, the present disclosure is directed to a battery interconnect system including at least one busbar and at least one foil sheet. The foil sheet is affixed to the at least one busbar at an interface and includes a first plurality of tabs extending from the interface. The first plurality of tabs are configured to contact corresponding terminals of a first plurality battery cells. Each of the first plurality of tabs includes a fusible link.

In some embodiments, the at least one foil sheet is affixed to the at least one busbar at the interface by at least one of ultrasonic-welding, laser-welding, press-welding, and explosive-welding.

In some embodiments, the at least one busbar includes branches.

In some embodiments, each of the respective fusible links includes a predetermined, locally minimum cross-sectional area configured to melt at substantially a predetermined electrical current.

In some embodiments, the foil layer includes a second plurality of tabs extending from the interface to a second plurality of battery cells.

In some embodiments, the first plurality of tabs extends to corresponding terminals of the first plurality of battery cells having a first polarity, and the second plurality of tabs extends to corresponding terminals of the second plurality of battery cells having a second polarity. For example, the first and second polarities may be positive and negative.

In some embodiments, each tab of the second plurality of tabs extends to two terminals, having the second polarity, of two battery cells of the second plurality of battery cells.

In some embodiments, the at least one busbar includes a first thickness, the first plurality of tabs includes a second thickness, and the second thickness is one fourth or less of the first thickness. In some embodiments, the second thickness is one tenth or less of the first thickness.

In some embodiments, the at least one busbar has an in-plane shape, the at least one foil sheet has substantially the same in-plane shape, and the interface is planar and has the same in-plane shape.

In some embodiments, the present disclosure is directed to a battery system including a plurality of battery cells grouped into at least one group of battery cells and an interconnect coupled to the at least one group of battery cells. The interconnect includes a busbar and a foil layer affixed to the busbar at an interface. The foil layer includes a first plurality of tabs extending from the interface to terminals of the at least one group of battery cells. Each of the first plurality of tabs includes a fusible link, and each of the first plurality of tabs is affixed to the terminals.

In some embodiments, the present disclosure is directed to a method for creating a battery interconnect system. The method includes aligning a foil blank to a busbar. The method also includes affixing the foil blank to the busbar to create an interconnect blank. The method also includes cutting the affixed foil blank to create an interconnect having a plurality of foil tabs including at least one fusible link.

In some embodiments, the method includes affixing a carrier to the interconnect and at least one additional interconnect to maintain a spatial arrangement of the interconnect and the at least one additional interconnect.

In some embodiments, the cutting the foil blank includes stamping the foil blank to create the plurality of foil tabs. In some embodiments, the stamping the foil blank includes progressively stamping the foil blank to create the plurality of foil tabs.

In some embodiments, the at least one fusible link includes a predetermined cross-sectional area configured to melt at substantially a predetermined electrical current.

In some embodiments, the method includes cutting the interconnect blank to create at least two interconnects after stamping the affixed foil blank. In some such embodiments, the method includes stamping the interconnect blank. Further, in some embodiments, the method includes affixing a carrier to the at least two interconnects to maintain a spatial arrangement of the at least two interconnect blanks, and the at least two affixed interconnects are electrically isolated from each other.

In some embodiments, the carrier includes a plurality of recesses configured to allow affixing the plurality of foil tabs to a plurality of corresponding battery cells. In some embodiments, the method includes affixing the plurality of foil tabs to a plurality of corresponding battery cells.

In some embodiments, the present disclosure is directed to a battery interconnect system including at least one busbar having a first thickness and a first plurality of stamped tabs having a second thickness, extending from the busbar and configured to contact corresponding terminals of a first plurality battery cells. The first plurality of stamped tabs are continuous with the at least one busbar, wherein each of the first plurality of stamped tabs comprises a fusible link, and wherein the second thickness is one fourth or less of the first thickness. For example, in some embodiments, the at least one busbar and the first plurality of stamped tabs are formed from single piece of material. In a further example, in some embodiments, the first plurality of stamped tabs is formed by pressing material having the first thickness.

In some embodiments, each of the respective fusible links includes a predetermined, locally minimum cross-sectional area configured to melt at substantially a predetermined electrical current.

In some embodiments, the battery interconnect system includes a second plurality of stamped tabs extending from the busbar to a second plurality of battery cells.

In some embodiments, the first plurality of tabs extends to corresponding terminals of the first plurality of battery cells having a first polarity, and the second plurality of stamped tabs extends to corresponding terminals of the second plurality of battery cells having a second polarity.

In some embodiments, each tab of the second plurality of stamped tabs extends to two terminals, having the second polarity, of two battery cells of the second plurality of battery cells.

In some embodiments, the second thickness is one tenth or less of the first thickness.

In some embodiments, the first plurality of stamped tabs is formed by pressing material having the first thickness.

In some embodiments, the at least one busbar includes one or more branches, and the first plurality of stamped tabs extend from the one or more branches.

In some embodiments, the present disclosure is directed to a battery system including a plurality of battery cells grouped into at least one group of battery cells and an interconnect coupled to the at least one group of battery cells. The interconnect includes at least one busbar having a first thickness, and a first plurality of stamped tabs having a second thickness, extending from the busbar and configured to contact corresponding terminals of a first plurality battery cells. The first plurality of stamped tabs are continuous with the at least one busbar. Each of the first plurality of stamped tabs includes a fusible link. The second thickness is one fourth or less of the first thickness.

In some embodiments, the present disclosure is directed to a method for creating a battery interconnect system. The method includes creating an interconnect blank comprising a first thickness. The method also includes pressing a portion of the interconnect blank to form a plurality of rough tabs having a second thickness. The second thickness is one fourth or less of the first thickness. The method also includes cutting the plurality of rough tabs to create an interconnect having a plurality of tabs including at least one fusible link.

In some embodiments, pressing the portion of the interconnect blank includes progressively pressing and trimming the portion to form the plurality of rough tabs In some embodiments, the method includes affixing a carrier to the interconnect and at least one additional interconnect to maintain a spatial arrangement of the interconnect and the at least one additional interconnect.

In some embodiments, the cutting the plurality of rough tabs comprises stamping the interconnect blank to create the plurality of tabs.

In some embodiments, the at least one fusible link includes a predetermined cross-sectional area configured to melt at substantially a predetermined electrical current.

In some embodiments, the method includes cutting the interconnect blank to create at least two interconnects after cutting the plurality of rough tabs. In some such embodiments, cutting the interconnect blank includes stamping the interconnect blank. Further, in some such embodiments, the method includes affixing a carrier to the at least two interconnects to maintain a spatial arrangement of the at least two interconnect blanks, and the at least two affixed interconnects are electrically isolated from each other.

In some embodiments, the method includes affixing the plurality of tabs to a plurality of corresponding battery cells through recesses in the carrier.

In some embodiments, creating the interconnect blank includes forming a busbar having a plurality of bosses, and the portion of the interconnect blank includes the plurality of bosses. For example, the bosses are stamped to form the plurality of tabs.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 8 shows a top view of a portion of an illustrative link between a busbar and two battery cells, and a portion of an illustrative fusible link between a busbar and a battery cell, in accordance with some embodiments of the present disclosure;

FIG. 9 shows a side view of a portion of the illustrative fusible link between the busbar and battery cell of FIG. 8, in accordance with some embodiments of the present disclosure;

FIG. 10 shows a top view of a portion of an illustrative battery interconnect coupled to a plurality of battery cells, in accordance with some embodiments of the present disclosure;

DETAILED DESCRIPTION

In some embodiments, the present disclosure is directed to a battery interconnect that has a desired current capacity, integrated fusible links, and is manufacturable using cost effective techniques. In some embodiments, the present disclosure is directed to processes for manufacturing the battery interconnect.

In some embodiments, a battery interconnect is desired to include spatial features at a range of length scales. For example, a busbar (i.e., a current collector) likely needs to carry larger currents and accordingly its cross-sectional areas are relatively larger to reduce ohmic losses. In a further example, a fusible link likely needs to carry a much smaller current and is desired to break the circuit when the current is above a threshold, thus requiring a relatively small cross-sectional area. These sometime disparate length scales are addressed using several techniques in the described embodiments.

In some embodiments, a battery interconnect is roughed out using a first manufacturing process, and then subsequently processed to form features at finer length scales (e.g., fusible links and weldable connections for the individual battery cells). For example, a battery interconnect may be stamped or cut to form the large-scale features such as the busbar, including a plurality of bosses at desired locations. In one or more subsequent processing steps, the plurality of bosses may be pressed (e.g., stamped in a die to reduce one or more spatial dimensions) and trimmed in alternating steps to form fusible links suitable for laser welding to individual battery cells. To illustrate, the bosses may achieve small length scales similar to a foil sheet after pressing.

In some embodiments, a battery interconnect is formed by joining two interconnect elements having unique properties to each other. For example, a battery interconnect may be formed by affixing a busbar to a stamped foil sheet (e.g., via ultrasonic-welding, laser-welding, press-welding, and explosive-welding, brazing, or any other suitable process). In one or more subsequent processing steps, portions of the adjoined foil sheet may be trimmed by stamping (e.g., using a cutting die) to form finer features that are suitable for laser welding to individual battery cells.

The interconnects described herein (e.g., layered and pressed interconnects) allow for a reduced number of connections to battery cells as compared to wire bonding. For example, because the busbar end of each link is integrated into the busbar, the number of total connections is halved as compared to wire bonding (e.g., only one end of each link needs bonding).

Figure 1:
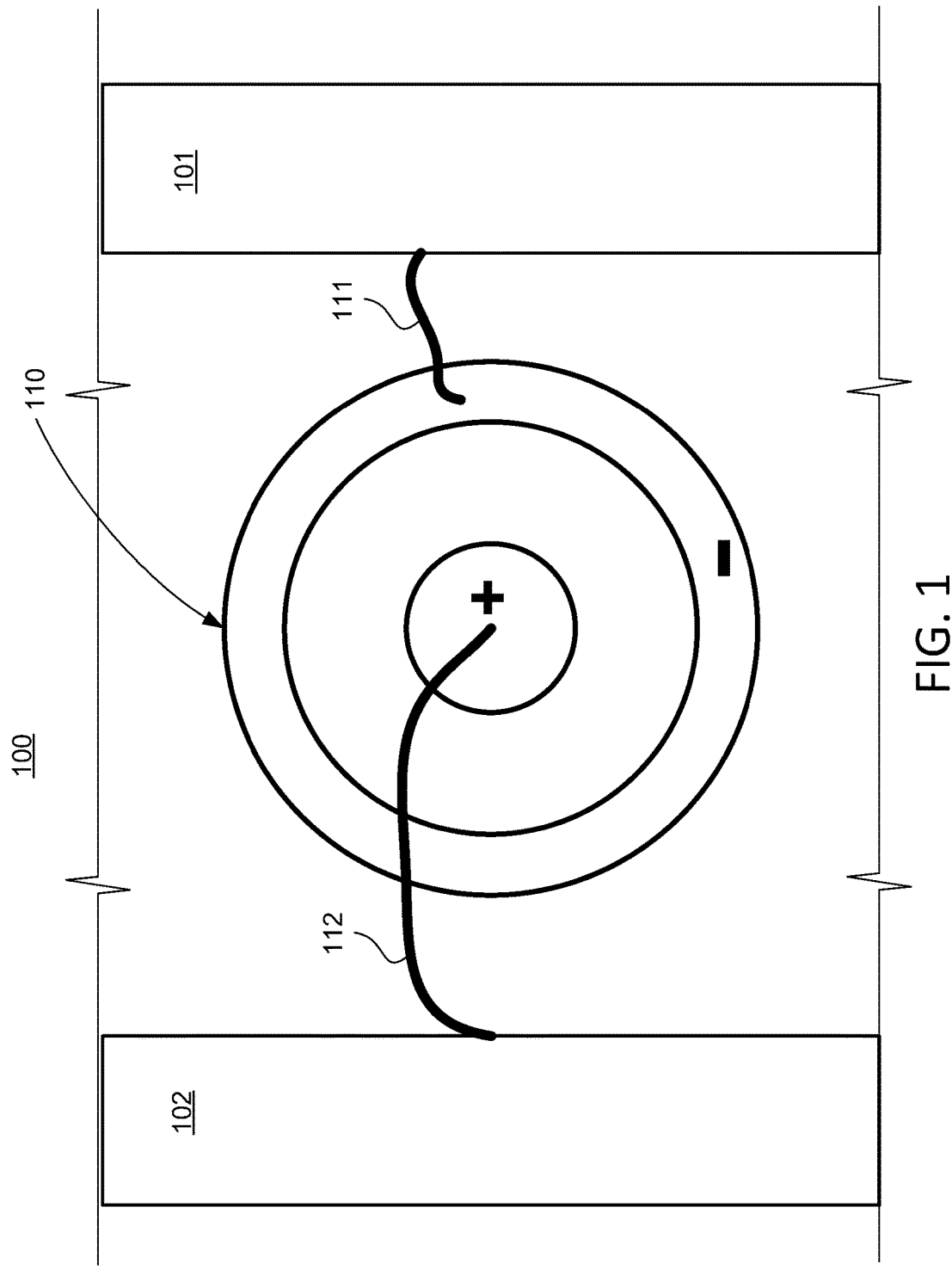
FIG. 1 shows a wire-bonded connection of a battery cell to a current collector.
Figure 2:
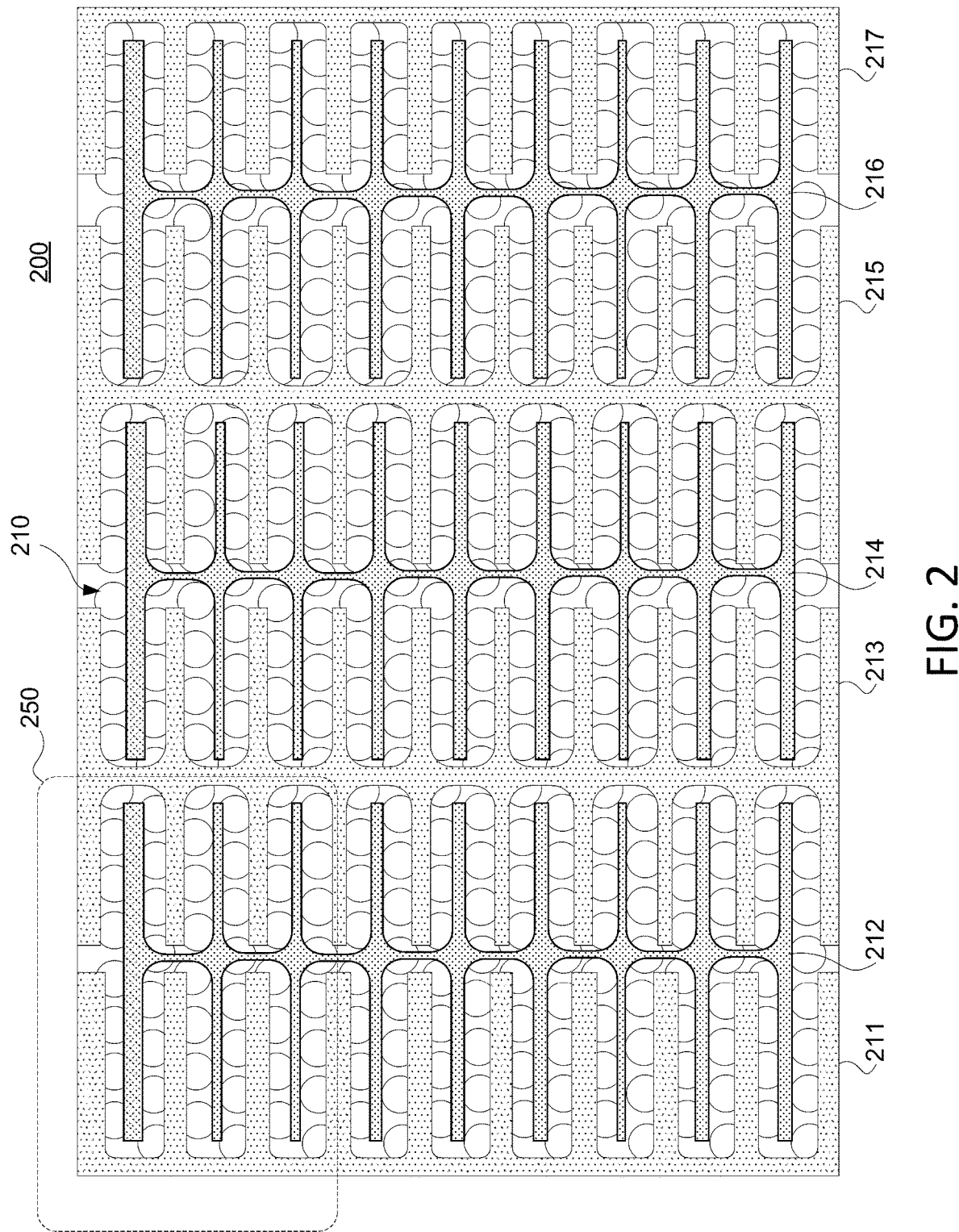
FIG. 2 shows a top view of an illustrative battery module having a plurality of battery interconnects arranged among a plurality of battery cells, in accordance with some embodiments of the present disclosure.

FIG. 2 shows a top view of illustrative battery module 200 having a plurality of battery interconnects (e.g., battery interconnects 211-217), arranged among a plurality of battery cells 210, in accordance with some embodiments of the present disclosure. Battery cells 210 are arranged in an array, which may be a regular pattern (e.g., a hexagonal close-packing), but need not be. Battery cells 210 are arranged into groups of battery cells coupled in parallel, and the groups are coupled in series. For example, as shown in FIG. 2, there are six groups of cells coupled in series via battery interconnects 211-217. Each cell is configured to be coupled to two adjacent battery interconnects, with the positive terminal coupled to one and the negative terminal to the other. The full voltage of battery module 200 is available between battery interconnects 211 and 217, while intermediate voltages are present between any other pair of battery interconnects. Section 250 is shown enlarged in FIG. 3 to illustrate further detail. It will be understood that battery module 200 of FIG. 2 is illustrated without links for clarity.

Figure 3:
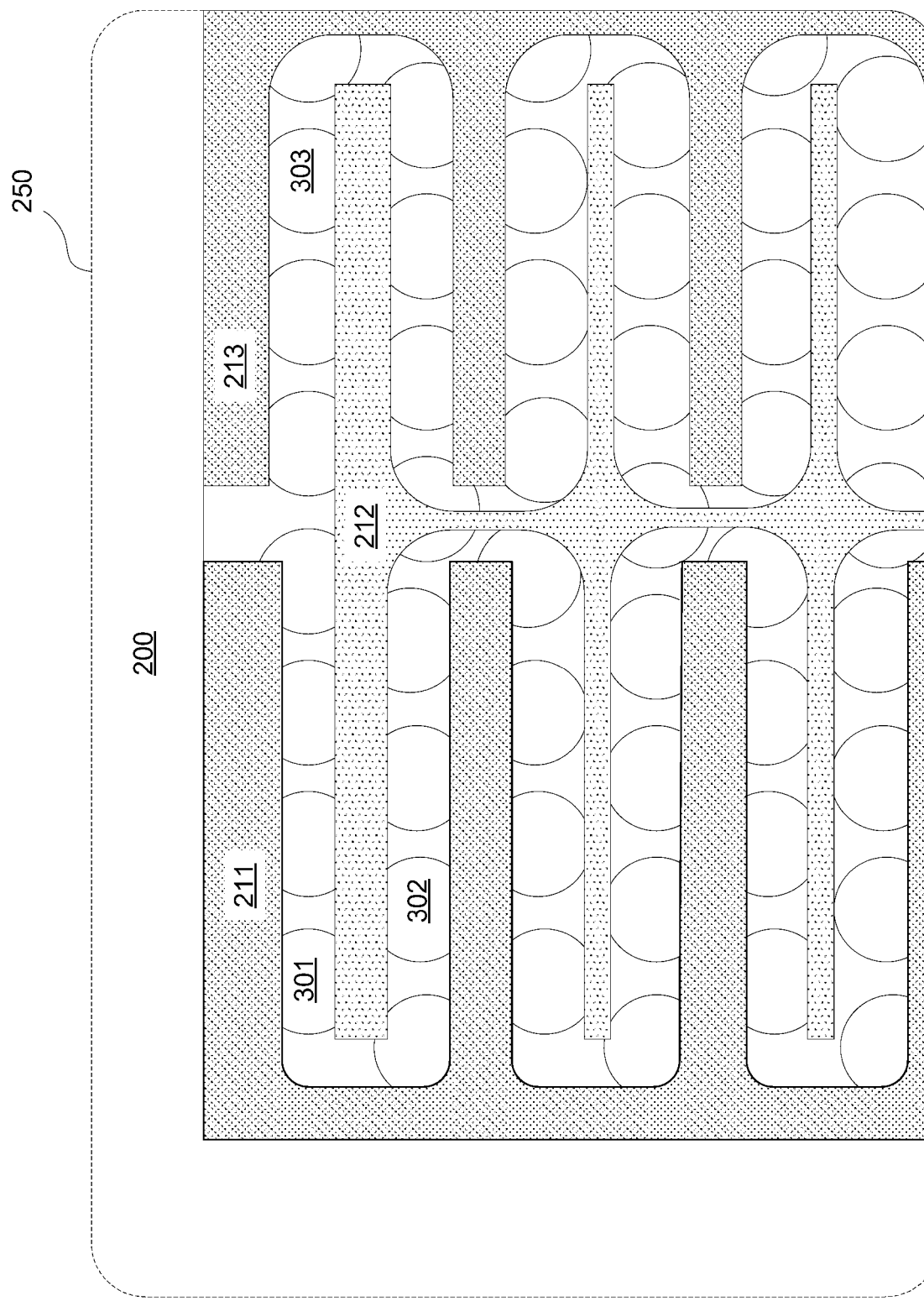
FIG. 3 shows an enlarged view of a portion of the illustrative battery module of FIG. 2, in accordance with some embodiments of the present disclosure.

FIG. 3 shows an enlarged view of section 250 from FIG. 2, in accordance with some embodiments of the present disclosure. As shown illustratively in FIG. 3, battery cells 301 and 302 are configured to be coupled in parallel to battery interconnects 211 and 212. Accordingly, a positive terminal of each of battery cells 301 and 302 is configured to be coupled to one of battery interconnects 211 and 212, and a negative terminal of each of battery cells 301 and 302 is configured to be coupled to the other of battery interconnects 211 and 212 (e.g., battery interconnects 211 and 212 are in series with each other). Further, battery cell 303 is configured to be coupled in series to both of battery cells 301 and 302. For example, battery cell 303 is configured to be coupled to battery interconnects 213 and 213 (e.g., a positive terminal of battery cell 303 to one, and a negative terminal of battery cell 303 to the other). Accordingly, each battery cell illustrated in FIG. 3 is configured to be coupled to two battery interconnects. To illustrate, each row of eight battery cells includes two adjacent groups of four battery cells connected in parallel, with the left and right groups connected in series. The left groups of four battery cells are connected in parallel with each other and the right groups of four battery cells are connected in parallel with each other. Accordingly, interconnect 212 as shown in FIG. 3 couples the 24 battery cells in the left groups (e.g., including battery cells 301 and 302) in series with the 24 battery cells in the right groups (e.g., including battery cell 303).

Battery interconnects 211-217, as illustratively shown in FIGS. 2-3, are shaped to reach a plurality of battery cells, and thus exhibit branch-like structure (e.g., having a spine with branches extending to the cells). The battery interconnects include busbars (e.g., the finger-like structures that are configured to be connected to battery cells via links) that are sized to carry substantial currents, from many battery cells, without incurring prohibitive Ohmic losses. An interconnect may include a plurality of finger-like branches, coupled together by a spine, in which the entire structure will be referred to herein a busbar. The individual connection to at least one terminal of each battery cell, however, requires a smaller cross-sectional area (e.g., and corresponding smaller spatial length scale in at least one dimension) to function as a fusible link. In some embodiments, it is desired to use a rapid assembly process in order to make a single joint connecting a battery cell to a busbar. For example, in some embodiments, this joint is made via laser welding. However, while busbars must be thick enough to carry sufficient current (e.g., on the order of at least 1 mm for Aluminum 1100), they are too thick to reliably laser weld (e.g., which typically requires on the order of 0.5 mm or less for Aluminum 1100). The links between battery cells and one or more busbars therefore may include smaller scale features. In some embodiments, the present disclosure is directed to the formation of this individual connection of each interconnect to corresponding battery cells. For example, the description below, in the context of FIGS. 4-11, is directed to pressed battery interconnects that include busbars and fusible links. In a further example, the description below, in the context of FIGS. 12-16, is directed to layered battery interconnects that include busbars and fusible links.

In some circumstances, it is desired to avoid using multipiece assemblies, to reduce the cost of a battery pack. A pressed battery interconnect may be formed as a single piece, and may include busbars, fusible link, and other links. In some circumstances, it is also desired that the battery interconnect accommodates laser welding for making the battery cell connections. Laser welding is an improvement on the wire-bonding process in terms of reliability and manufacturing time. For example, although manufacturing equipment for laser welding may be more expensive, the process may be cheaper when the production rate, which may be performed in parallel, is taken into account. The description of FIGS. 4-11 provides further details regarding pressed battery interconnects.

Figure 4:
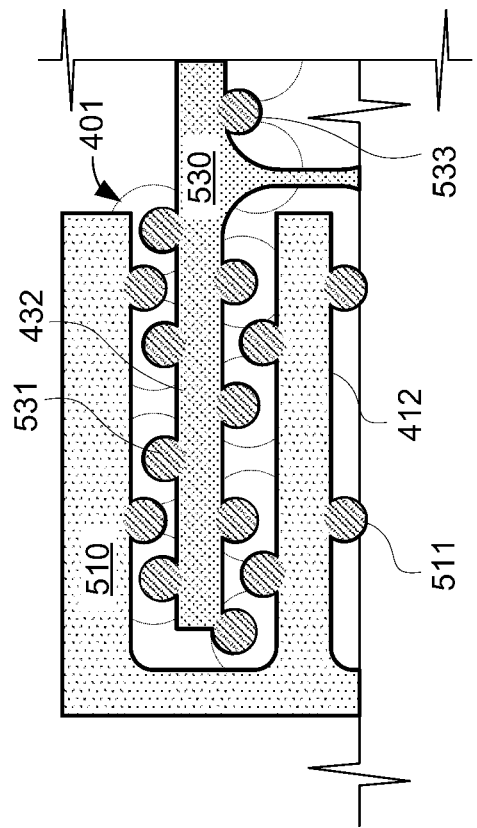
FIG. 4 shows a top view of a portion of illustrative interconnect blanks, in accordance with some embodiments of the present disclosure.

FIG. 4 shows a top view of a portion of illustrative interconnect blanks 410 and 430, in accordance with some embodiments of the present disclosure. In some embodiments, interconnect blanks 410 and 430 may be rough-cut (e.g., and will experience subsequent processing to refine features). Interconnect blanks 410 and 430, as shown in FIG. 4, are arranged relative to each other and to battery cells 401 for reference, although they need not be arranged during processing (e.g., the processes described in the context of FIGS. 4-7). In some embodiments, an interconnect blank is formed by stamping, laser cutting, plasma cutting, water-jet cutting, machining, any other suitable manufacturing process, or any combination thereof. Interconnect blanks 410 and 430, as illustratively shown in FIG. 4, include a roughly uniform thickness in the rough-cut stage. Uniform thickness is not necessary, and a rough-cut interconnect blank may be tapered, stepped, or otherwise include different thicknesses. Further, features in the plane of the interconnect blank (i.e., the plane of axes 490 and 491) may be formed having at least some suitable minimum spatial dimension to ensure machinability. Interconnect blanks 410 and 430 include respective busbars 412 and 432, from which bosses may extend. Bosses 411 of interconnect blank 410, and bosses 431 and 433 of interconnect blank 430, are intended to be pressed and trimmed to form links (e.g., by processes described in the context of FIGS. 5-7) for attaching the interconnect blanks to suitable battery cells of battery cells 401. In some embodiments, bosses 411 need not be included as extensions, and local portions of a busbar may be pressed and trimmed at subsequent processing stages (e.g., those described in the context of FIGS. 5-7). Accordingly, in some embodiments, the cross-sectional area of a busbar may change slightly (e.g., a slight necking) as local regions are pressed to form links.

The plane of axes 490 and 491 is referred to herein as "in-plane." Dimensions such as width and length are referred to in this plane primarily. Dimensions such as thickness are referred to normal to this plane (e.g., into the page of FIG. 4, as illustrated).

Figure 5:
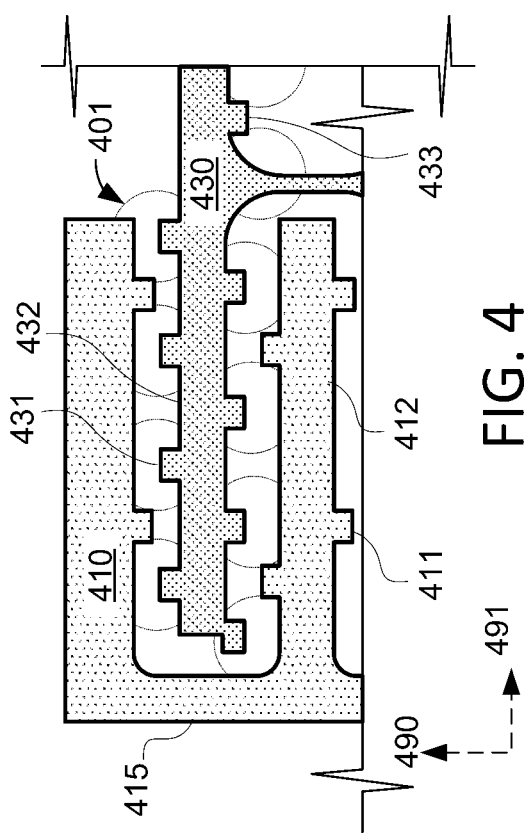
FIG. 5 shows a top view of the portion of the illustrative interconnect blanks of FIG. 4 after pressing, in accordance with some embodiments of the present disclosure.

FIG. 5 shows a top view of the portion of illustrative interconnect blanks 410 and 430 of FIG. 4 after pressing (i.e., now respective interconnect blanks 510 and 530), in accordance with some embodiments of the present disclosure. In some embodiments, pressing includes placing interconnect blanks in respective dies, and applying a stamping process to cause material flow and deformation (i.e., material is not necessarily removed). Resulting bosses 511 of interconnect blank 510 and resulting bosses 531 and 533 of interconnect blank 530, have a thickness less than that of bosses 411, 431, and 433, respectively. Accordingly, bosses 511, 531, and 531 may have increased area in the plane defined by axes 490 and 491 from deformation.

Figure 6:
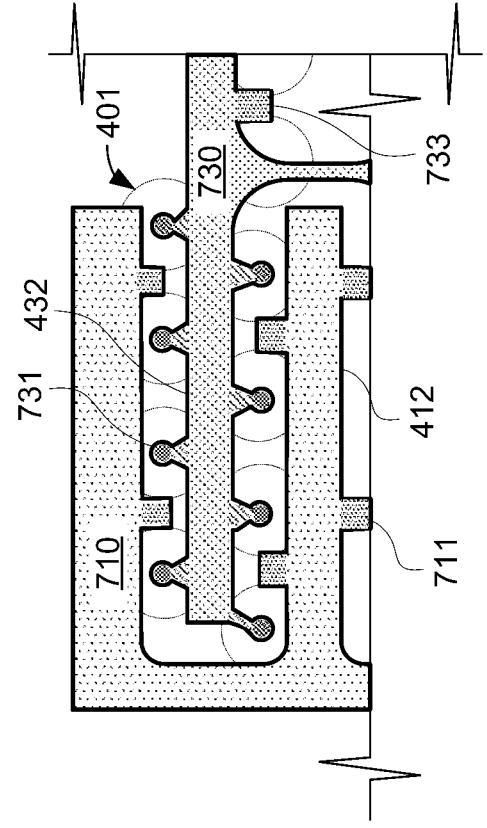
FIG. 6 shows a top view of the portion of the illustrative interconnect blanks of FIG. 5 after trimming, in accordance with some embodiments of the present disclosure.

FIG. 6 shows a top view of the portion of illustrative interconnect blanks 510 and 530 of FIG. 5 after trimming (i.e., now respective interconnect blanks 610 and 630), in accordance with some embodiments of the present disclosure. In some embodiments, trimming includes placing interconnect blanks in respective dies, and applying a stamping process to shear material (i.e., material is necessarily removed). Resulting bosses 611 of interconnect blank 610 and resulting bosses 631 and 633 of interconnect blank 630 have a thickness less than that of bosses 411, 431, and 433, respectively, and an area in the plane of axes 490 and 491 that is reduced from bosses 511, 531, and 533, respectively. Trimming allows more precise dimensions to be formed, which may help in forming fusible links.

Figure 7:
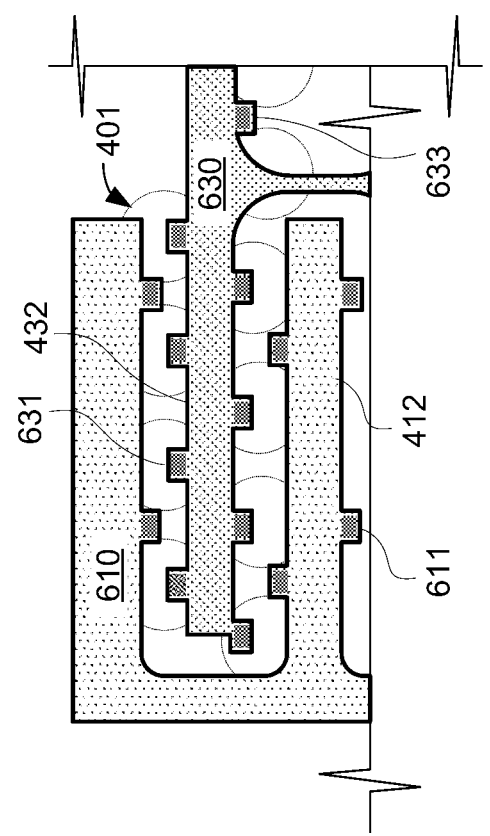
FIG. 7 shows a top view of the portion of the illustrative interconnect blanks of FIG. 6 after processing is complete, in accordance with some embodiments of the present disclosure.

FIG. 7 shows a top view of the portion of illustrative interconnects 710 and 730 after processing is complete, in accordance with some embodiments of the present disclosure. As illustrated in FIG. 7, links 711, 731, and 733 are formed from initial bosses 411, 431, and 433, respectively, and are configured to be affixed to suitable cells of battery cells 401 (e.g., by laser welding or other suitable process).

In some embodiments, pressing, trimming, or both may occur sequentially more than once (e.g., progressive stamping and trimming). For example, pressing, trimming, or both, may be repeated until a desired thickness, shape, or material property (e.g., hardness) is achieved. In some embodiments, a single process may be used to form links 711, 731 and 733. For example, a die may be configured to shape and trim a portion of an interconnect blank in a single stamp process. Any suitable technique may be used to form links suitable affixing to battery cells from a thicker portion of material, in accordance with some embodiments of the present disclosure. Links 711, 731, and 733 may be referred to as stamped tabs, because they are continuous in material to busbars 710 and 730 and have been formed by stamping material of the busbars.

As illustratively shown in FIG. 7, each of links 711 and 733 are configured to be coupled to two respective battery cells of cells 401. Links 711 and 733 may be, but need not be, fusible links. In some embodiments, links 711 and 733 may include forks, bifurcations, branching, any other suitable features for extending to more than one cell, or any combination thereof. Although not shown in FIG. 7, in some embodiments, links 711 and 733 may be configured to be affixed to a single, respective battery cell (e.g., and there may exist twice as many links as are shown in FIG. 7).

Although not shown in FIGS. 4-7, additional links may be formed using the processes described in the context of FIGS. 4-7, which may be used as instrumentation features, aligning features, measurement features, any other suitable purpose or any combination thereof. For example, a link may be included to be used as a voltage tap, and accordingly may be configured to have a wire welded to it. In a further embodiment, a reference circular link may be formed to aide in visual or mechanical aligning during installation. Any suitable features may be pressed from an interconnect blank in addition to links.

FIGS. 8-10 show illustrative interconnects electrically coupled to battery cells, in accordance with some embodiments of the present disclosure. For example, any of the illustrative processes described in the context of FIGS. 4-7 may be used to form battery interconnects, which may be coupled to battery cells as illustrated in FIGS. 8-10.

FIG. 8 shows a top view of a portion of illustrative link 811 between busbar 810 and two battery cells 801 and 802, and a portion of illustrative fusible link 813 between busbar 810 and battery cell 803, in accordance with some embodiments of the present disclosure. Link 811 and fusible link 813 may be formed using any of the illustrative processes described in the context of FIGS. 4-7, for example.

Link 811 is affixed to battery cells 801 and 802 at welds 815 and 816, respectively. For example, in some embodiments, link 811 is laser welded to battery cells 801 and 802, and welds 815 and 816 may be arranged at any suitable location at the interface of link 811 and battery cells 801 and 802. In some embodiments, a link may be welded at more than one location to each battery cell. In some embodiments, for example, link 811 may be coupled to a first polarity of battery cells 801 and 802 (e.g., positive or negative). In some embodiments, a link may be configured to only interface to one battery cell, and accordingly, more links may be required (e.g., twice as many). Although not shown in FIG. 8, in some embodiments, link 811 may include a fuse section, configured to break electrical contact if the combined current from battery cells 801 and 802 is above a fusing current for a suitable amount of time. In some embodiments, for which link 811 does not include an intended fuse section, the cross-sectional area at any point of link 811 may necessarily be larger than a cross-sectional area of a corresponding fusible link.

Fusible link 813 is affixed to battery cell 803 at welds 817 and 818, respectively. For example, in some embodiments, link 811 is laser welded to battery cells 801 and 802, and welds 815 and 816 may be arranged at any suitable location at the interface of link 811 and battery cells 801 and 802. In some embodiments, a fusible link may be welded at a single location to a battery cell. In some embodiments, the weld(s) between a fusible link and a battery cell are configured to provide a lower electrical resistance than the fuse section (e.g., having an effective cross-sectional area larger than the cross-sectional area of the throat), and accordingly the fusible link still acts as a fuse at throat 814 rather than the weld(s). Throat 814 includes a cross-sectional area that is a local minimum, such that large currents will cause fusible link 813 to fail at throat 814 (i.e., where electrical resistance and corresponding ohmic heating will be largest). In some embodiments, for example, fusible link 813 may be coupled to a first polarity of battery cell 803 (e.g., positive or negative). In some embodiments, all links of a battery system may include fusible links, such that each battery cell has two fuses in series (e.g., one fuse per link, and one link each per positive and negative terminals). Illustrative link 811 and fusible link 813 may be preferred over wire bonds, for example, because each only requires a single connection point per battery cell (e.g., although optionally more connections may be made) since no bond is needed at the busbar interface (i.e., the interconnect is a one-piece design).

FIG. 9 shows a side view of a portion of illustrative fusible link 813 between busbar 810 and battery cell 803 of FIG. 8, in accordance with some embodiments of the present disclosure. As illustrated in FIG. 9, busbar 810 has a relatively large thickness as compared to fusible link 813.

FIG. 10 shows a top view of a portion of an illustrative battery interconnect 1010 coupled to a plurality of battery cells 1001 and plurality of battery cells 1002 (e.g., the positive central terminal is shaded for clarity), in accordance with some embodiments of the present disclosure. Battery interconnect 1010 includes busbar 1013, links 1011 and fusible links 1012. Links 1011 are each coupled (e.g., laser welded) to two of battery cells 1001, as illustrated in FIG. 10. Fusible links 1012 are each coupled (e.g., laser welded) to one of battery cells 1002 (e.g., there are twice as many fusible links 1012 as links 1011 per battery module, as illustrated). As illustratively shown in FIG. 10, battery cells 1001 are in series with battery cells 1002, as connected by interconnect 1010. For example, interconnect 1010 is connected to the negative polarity terminals of battery cells 1001, and the positive polarity terminals of battery cells 1002. In an illustrative example, the voltage between positive polarity terminals of battery cells 1001 and negative polarity terminals of battery cells 1002, as connected by interconnect 1010, may be nominally twice that of a single battery cell. Battery interconnect 1010 includes two different types of links (e.g., links 1011 and fusible links 1012). A battery interconnect may include any suitable number of links, fusible links, and measurement features, having any suitable geometric properties (e.g., thicknesses, widths, lengths, shapes, cross-sectional areas), in accordance with the present disclosure. A battery interconnect may include any suitable material such as, for example, aluminum (e.g., aluminum 1100), copper, steel (e.g., stainless steel), an alloy, any other suitable metal, or any suitable combination thereof. In some embodiments, a battery module may include a plurality of battery interconnects, coupled in series, parallel, or a combination thereof to couple a plurality of battery cells to a DC load. It will be understood that although a single interconnect is illustrated in FIG. 10, additional interconnects (not shown) may be included, such that each battery cell is connected to two interconnects. For example, a first additional interconnect may connect to the positive terminals of battery cells 1001 (e.g., via fusible links), and a second additional interconnect may connect to the negative terminals of battery cells 1002. In a further example, the additional interconnects may include busbars that extend between features of interconnect 1010 (e.g., as shown illustratively in FIG. 2).

Figure 11:
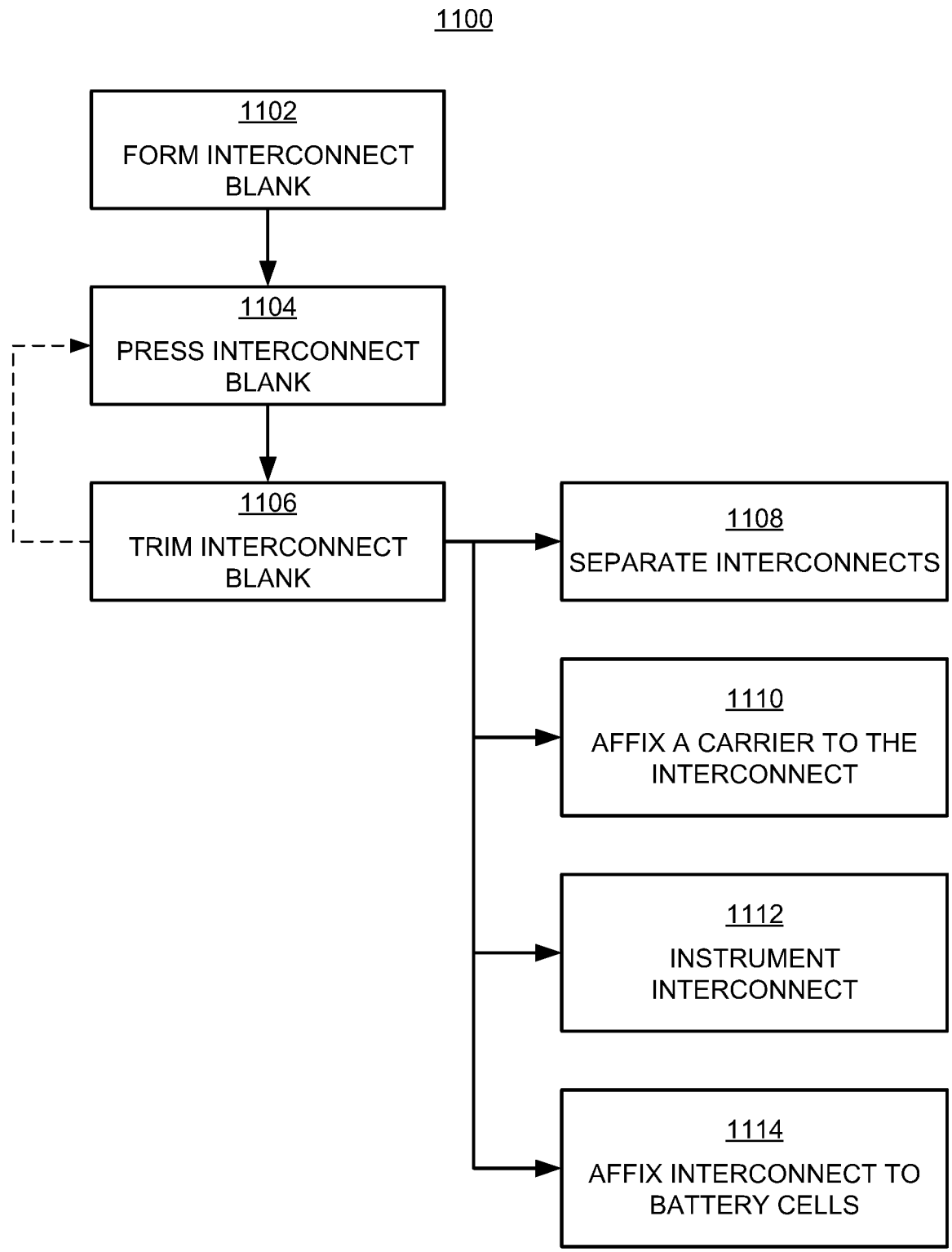
FIG. 11 shows a flowchart of an illustrative process for forming a pressed battery interconnect, in accordance with some embodiments of the present disclosure.

FIG. 11 shows a flowchart of illustrative process 1100 for forming a pressed battery interconnect, in accordance with some embodiments of the present disclosure.

Step 1102 includes forming an interconnect blank. In some embodiments, an interconnect blank is formed by water-jet cutting, laser cutting, or plasma cutting a metal plate billet. In some embodiments, an interconnect blank is formed using electrical discharge machining (e.g., wire EDM). In some embodiments, an interconnect bank is formed by stamping a metal plate, using a suitable die, to trim away regions desired to be open. In some embodiments, forming an interconnect blank includes forming large-scale features including for example, current-carrying regions and branching regions. An interconnect blank may resemble an interconnect but need not. For example, a busbar blank may include more than one interconnect, arranged as a single part, and connected by regions intended for removal at a later processing step (e.g., not shown, but interconnects may be separated by stamping, machining or any other suitable process). In some embodiments, the interconnect blank may include bosses or other protrusions intended to be links (e.g., after pressing). In some embodiments, the interconnect blank need not include bosses or other protrusions, and a small region of the blank may be pressed (e.g., thus leaving a slight notch in the busbar portion). In some embodiments, an interconnect blank may include bosses intended to be links, and the thickness of the bosses may be reduced via machining prior to pressing. For example, although achieving the desired link thickness is challenging by conventional machining, the thickness of the bosses may be halved or otherwise reduced from that of the busbar region to aid in subsequent pressing.

Step 1104 includes pressing the interconnect blank. In some embodiments, a die is arranged relative to the interconnect blank, and a press is used to press bosses or suitable regions of the busbar region into a flatter geometry (e.g., thinner). In some embodiments, step 1104 includes progressively pressing suitable regions of the interconnect blank until a desired thickness is achieved (e.g., the thickness is less than a threshold). In some embodiments, all links of the interconnect blank are pressed in a single action. In some embodiments, only a subset of links, or even a single link, are pressed in a single action (e.g., to provide more control, allow simpler dies, require less force, or otherwise to ease the process). The intended links, may spread in-plane as they are pressed. For example, for a given volume of material, reducing the thickness leads to an increase in one or more other spatial dimensions. Links may have, but need not have, a uniform thickness.

Step 1106 includes trimming the interconnect blank. In some embodiments, step 1106 includes cutting, stamping, shearing, or otherwise reducing the in-plane area of the interconnect blank. For example, step 1106 may include water-jet cutting, laser cutting, plasma cutting, electric discharge machining, stamping, punching, or a combination thereof. In some embodiments, step 1106 includes trimming the links to a desired shape and size.

To illustrate, step 1104 may be applied to achieve a desired thickness of a link, while step 1106 is applied to achieve a desired shape and in-plane size of a link. Accordingly, in some embodiments, steps 1104 and 1106 may be combined, repeated, or otherwise modified to result in a desired shape. Further, steps 1104 and 1106 include reshaping existing material, or removing existing material, without the addition of new material. Still further, steps 1104 and 1106 are performed in the context of a single part, although each of steps 1104 and 1106 may be performed to all links, a portion of links, or a single link.

Illustrative steps 1108, 1110, 1112, and 1114 may be performed after links are formed (e.g., via pressing). Steps 1108, 1110, 1112, and 1114 may be performed in any suitable order, combined, omitted entirely, or otherwise modified, in accordance with the present disclosure.

Step 1108 includes separating interconnects. Step 1108 may be performed when an interconnect blank includes more than one intended interconnect, which may be connected to each other by material (e.g., the interconnect blank includes continuous material). In embodiments, where an interconnect blank is intended as a single interconnect, step 1108 may be omitted, for example. In some embodiments, an interconnect blank includes a portion that corresponds to a desired interconnect, and a portion that may be present to ease manufacturing. For example, an interconnect blank may include material which provides rigidity among busbar regions and allows large forces to be applied to the interconnect blank. After steps 1104 and 1106 (i.e., when links are formed) are performed, and further large forces or processing are not required, the extra material may be removed, thus leaving the desired interconnect blank. Step 1108 may include water-jet cutting, laser cutting, plasma cutting, electric discharge machining, stamping, punching, or a combination thereof to separate the individual interconnects.

Step 1110 includes affixing a carrier to one or more interconnects. A carrier is a cover that maintains a relative arrangement of interconnects, protects interconnects, and eases installation of interconnects to be included in a battery system after being formed, for example. A carrier may be desired because interconnects include links, which may be susceptible to damage due to their relatively small thickness, for example. Further, typically interconnects must be precisely aligned to battery cells and to one another prior to affixing to the battery cells. Handling interconnects, transporting interconnects, arranging interconnects relative to a plurality of battery cells, and affixing interconnects to the plurality of battery cells may be achieved by using a carrier.

Step 1110 may be performed on a single interconnect, or multiple interconnects (whether separated already or not). Step 1110 may include adhering (e.g., via a suitable adhesive), spot welding (e.g., laser welding, ultrasonic welding, MiG tack welding), latching (e.g., a clamp, latch, or other mechanism to maintain relative position), fastening (e.g., with threaded bolts), or any other suitable means for temporarily and releasably affixing the carrier to the interconnect, interconnects, or interconnect blank. Further details regarding carriers is described herein in the context of FIGS. 17-18, for example.

Step 1112 includes instrumenting the interconnect. In some embodiments, step 1112 includes applying one or more sensors to an interconnect. For example, a thermocouple or resistive temperature detector may be affixed to an interconnect. In some embodiments, a test lead may be affixed to an interconnect. For example, a wire lead may be affixed to an interconnect (e.g., at an instrumentation link which may be formed using any of the illustrative processes described herein) and may be coupled to control circuitry configured to measure a voltage of the interconnect. In a further example, each interconnect may be coupled to control circuitry via test wires.

Step 1114 includes affixing one or more interconnects to a plurality of battery cells. Step 1114 may include arranging the one or more interconnects for affixing. For example, step 1114 may include arranging one or more interconnects relative to the plurality of battery cells, aligning the one or more interconnects to each other, aligning the one or more interconnects to the battery cells or a subset thereof, aligning the one or more interconnects to a reference feature of a battery system, any other suitable arranging considerations, or any combination thereof. When arranged, step 1114 may include welding each link to one or more suitable battery cells of the plurality of battery cells. For example, step 1114 may include laser welding or ultrasonically welding a link to one or more suitable battery cells.

In some embodiments, for example, step 1114 may be performed after step 1110, while the one or more interconnects are affixed to a carrier. Because the carrier provides handling functionality, and maintains alignment, it may be desired to maintain the carrier in place during affixing links to battery cells. In some embodiments, the carrier may include open features which can accommodate welding equipment such that welding links to battery cells can be performed with the carrier in place.

It is contemplated that the steps or descriptions of FIG. 11 may be used with any other embodiments of this disclosure. In addition, the steps and descriptions described in relation to FIG. 11 may be done in alternative orders or in parallel to further the purposes of this disclosure. For example, an interconnect blank may be trimmed at step 1106 and then pressed at step 1104. Any of these steps may also be skipped or omitted from the process.

In some circumstances, it is desired to use a layered interconnect to achieve current-carrying capacity, ease in affixing the interconnect to battery cells, and fusible link functionality. A layered battery interconnect may be formed as two or more pieces having different geometrical properties, which may be joined as layers. In some circumstances, it is also desired that the battery interconnect accommodates laser welding for making the battery cell connections. The description of FIGS. 12-16 provides further details regarding layered battery interconnects.

Inclusion of a fuse for each battery cell can be accomplished by laser welding a thin foil of conductive material (i.e. aluminum, copper, or nickel) with a small cross-sectional area (e.g., a throat) to one or both of the battery cell's terminals. Because a thin foil cannot likely accommodate the current of multiple battery cells, it is desired for the foil to transition to a busbar with larger cross-sectional area (e.g., thicker material) to carry larger currents. Because it may be difficult to make this transition from thin foil to thick busbar (e.g., especially when there are so many connections, and the thin foil is difficult to handle, the thin foil is joined to the thicker busbar allowing faster and more cost-effective production (e.g., especially for high volume).

Figure 12:
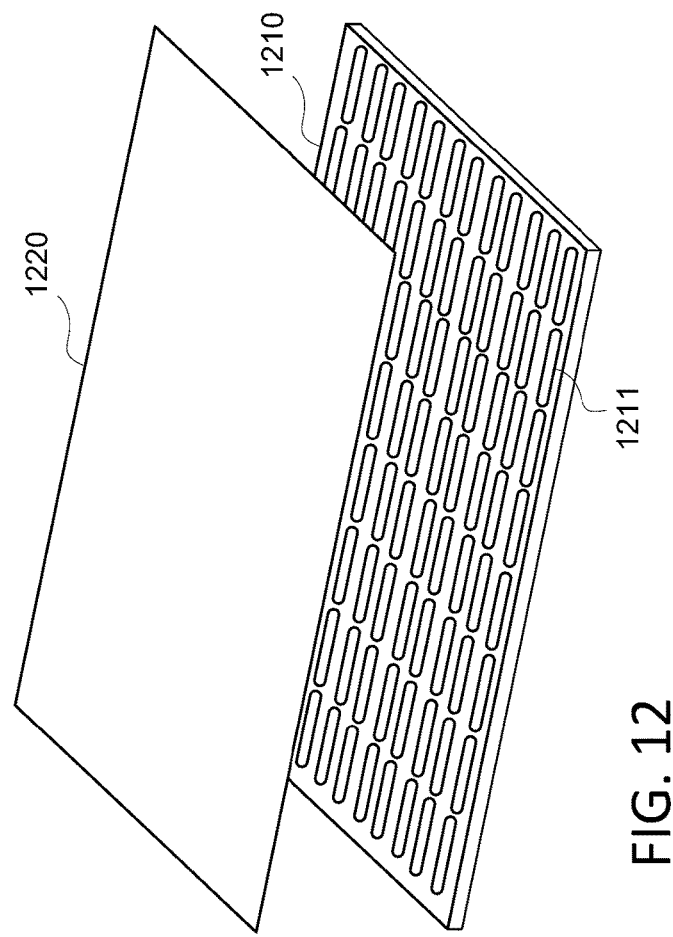
FIG. 12 shows a perspective view of an illustrative busbar blank and a foil sheet, prior to adjoining, in accordance with some embodiments of the present disclosure.

FIG. 12 shows a perspective view of illustrative busbar blank 1210 and foil sheet 1220, prior to adjoining, in accordance with some embodiments of the present disclosure. A layered interconnect may be formed from a busbar blank (e.g., which may be similar to a rough-cut interconnect blank) and a foil sheet (e.g., cut or stamped to size). Busbar blank 1210 may include a single intended interconnect, or more than one intended interconnect (e.g., which may be separated at a processing step). For example, a busbar blank may include the current collecting portion of a single interconnect. In a further example, a busbar blank may include the current collecting portions of several interconnects, which may be processed as a single piece for simplicity and cost, and then be separated at a later processing step.

In some embodiments, busbar blank 1210 includes features 1211, which may include, for example, slots, branches, forks, holes, or other suitable features or combinations thereof that may be desired in an interconnect (e.g., having the structure of any of illustrative interconnects 211-217 of FIG. 2).

Foil sheet 1220 is thinner than busbar blank 1210, and accordingly may be more susceptible to damage. In some embodiments, because of the relative thinness of foil sheet 1220, it may be a plane sheet, without cutouts, extensions or other features that may be susceptible to damage. Foil sheet 1220 may be flat, rolled, folded, pleated, or be available as a part in any suitable shape, size, and configuration.

Foil sheet 1220 may include any suitable conductive material such as, for example, aluminum, copper, or nickel. In some embodiments, the thickness of foil sheet 1220 is driven by the requirements of the joining process (e.g., laser welding, ultrasonic welding, or resistance welding) that is used to affix links to one or more battery cells. Further, foil sheet 1220 must be sufficiently thin to form a link having the cross-sectional area necessary to act as a fuse in over-current conditions. In an illustrative example, busbar blank 1210 may by in the range of 2 to 30 times thicker than foil sheet 1220 in order to carry the required current without overheating.

Figure 13:
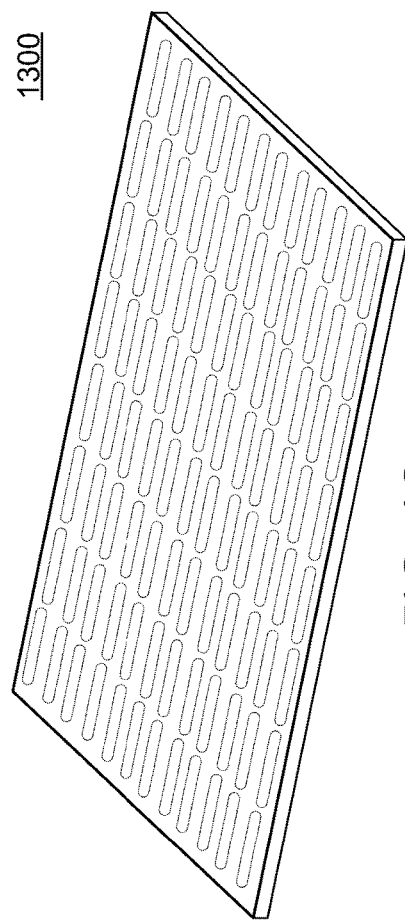
FIG. 13 shows a perspective view of the illustrative busbar blank and foil sheet of FIG. 12, after adjoining, in accordance with some embodiments of the present disclosure.

FIG. 13 shows a perspective view of illustrative busbar blank 1210 and foil sheet 1220 of FIG. 12, after adjoining, in accordance with some embodiments of the present disclosure. Foil sheet 1220 may be affixed to busbar blank 1210 using any suitable technique including, for example, laser welding, ultrasonic roll welding, spot welding (e.g., using any suitable welding technique), brazing, soldering, or a combination thereof. In some embodiments, foil sheet 1220 may be fastened (e.g., using a fastener such as a rivet, bolt, or barb) to busbar blank 1210 prior to application of the above processes. Welding, brazing, and soldering result in large contact surface areas between foil sheet 1220 and busbar blank 1210, improving electrical conductivity, reducing interface resistance, and providing structural rigidity (e.g., reducing stress concentrations from limited contact). The adjoined foil sheet and busbar is termed an interconnect blank for purposes of discussion. Adjoined foil sheet 1220 and busbar blank 1210 are referred to as interconnect blank 1300.

Interconnect blank 1300 includes two primary thicknesses, that of the current collecting portion (e.g., busbar blank 1210) and that of the foil (e.g., foil sheet 1220). The foil portion of interconnect blank 1300 may be trimmed, or otherwise formed into links configured to be affixed to battery cells. Because the foil is rigidly affixed to the busbar, the structural rigidity is improved, and the foil is less susceptible to damage, especially as features having finer geometric properties (e.g., fusible links) are formed.

Figure 14:
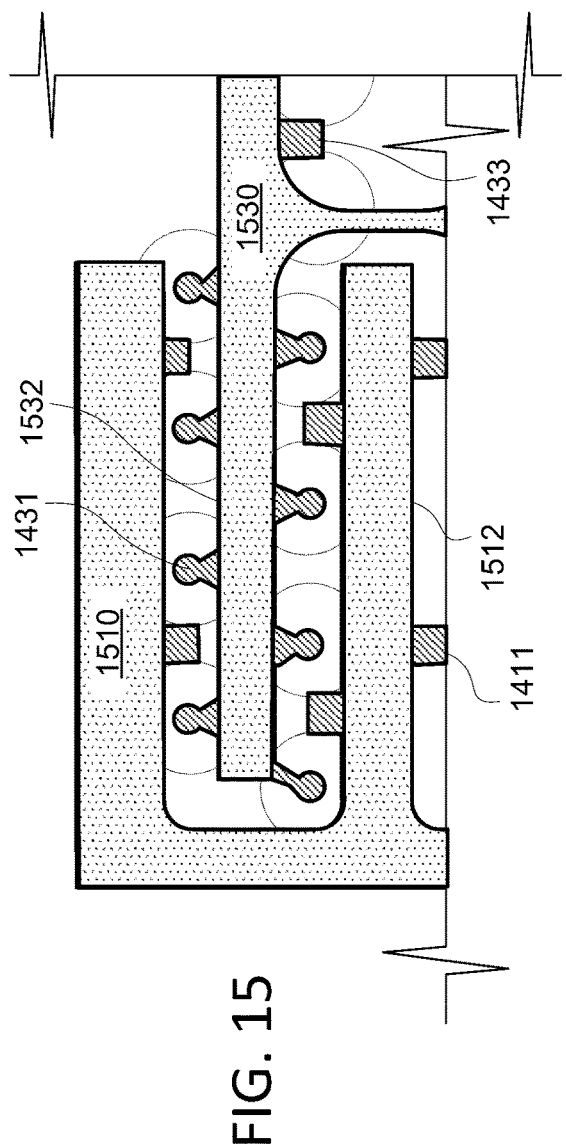
FIG. 14 shows a top view of the illustrative interconnect blank of FIG. 13, after trimming, in accordance with some embodiments of the present disclosure.

FIG. 14 shows a top view of illustrative interconnect blank 1300 of FIG. 13, after trimming, in accordance with some embodiments of the present disclosure. After trimming, interconnect blank 1300, as shown in FIG. 14, is referred to as interconnect blank 1400. Interconnect blank 1400 includes links 1411 and 1433, and fusible links 1431. As shown, interconnect blank 1400 is a single piece, having two layers including the thicker layer from busbar blank 1210 and the thinner foil layer from foil sheet 1220. Regions 1412, 1413, and 1414 are not intended to remain in the final interconnect(s), but are present in interconnect blank 1400 to provide structural support and maintain the relative position of the regions of interconnect blank 1400. For example, interconnect blank 1300 may be stamped in a single die, rather than individually stamping individual blanks for each interconnect. In some embodiments, interconnect blank 1300 is progressively stamped, using progressive dies, to achieve the final form of links 1411 and 1433, and fusible links 1431. Battery cells 1401 are shown for reference and context in FIG. 14. Typically, battery cells 1401 are not preset during formation of interconnects, and the final interconnects are affixed to battery cells 1401 (e.g., as shown illustratively in FIG. 15).

Figure 15:
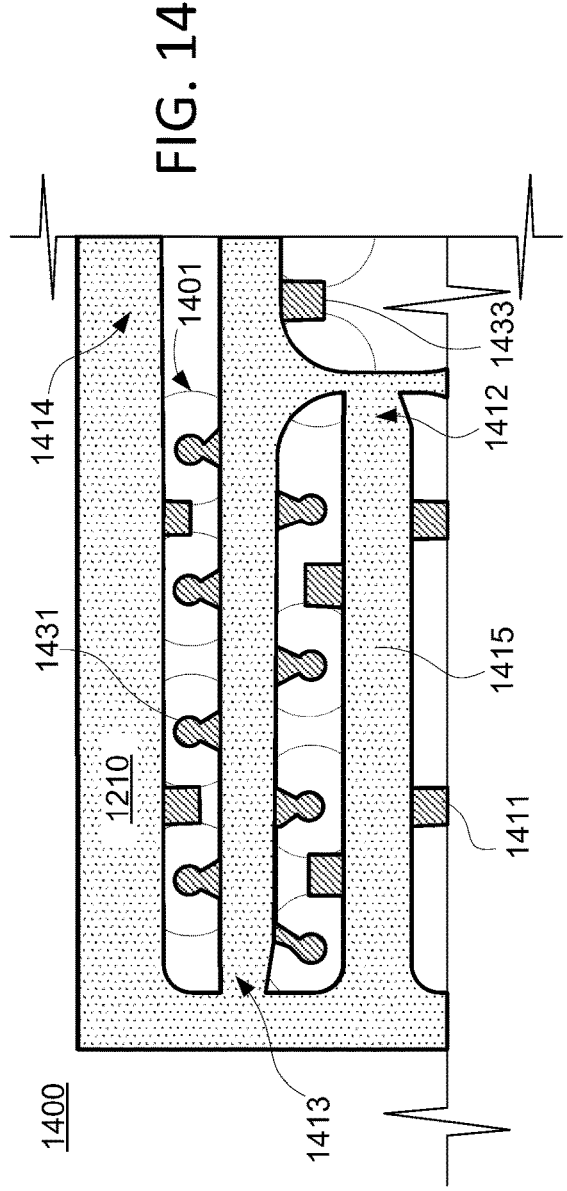
FIG. 15 shows a top view of the illustrative interconnect blank of FIG. 14, after separation into individual interconnects, in accordance with some embodiments of the present disclosure.

FIG. 15 shows a top view of the illustrative interconnect blank 1400 of FIG. 14, after separation into individual interconnects, in accordance with some embodiments of the present disclosure. After separation of interconnect blank 1400, as shown in FIG. 15, the resulting interconnects are referred to as interconnects 1510 and 1530. Regions 1412, 1413, and 1414 are removed (e.g., via machining, stamping, or any other suitable process), thus separating interconnects 1510 and 1530 and forming electrically independent interconnects. For example, interconnects 1510 and 1530 may then be electrically coupled in series via suitable battery cells of cells 1401. Further, links 1411 and 1433, while similar in shape, are now included in separate interconnects (i.e., interconnects 1510 and 1530, respectively). Links 1411 and 1433, and fusible links 1431 may be affixed to suitable cells of battery cells 1401 using any suitable process such as welding (e.g., laser welding or ultrasonic welding), for example. Interconnects 1510 and 1530 include current-carrying busbars portions 1512 and 1532, respectively, and relatively thinner links 1411 and 1433, respectively. Interconnect 1530 includes fusible links 1431, which each include a throat configured to act as a fuse and having a suitable fusing current. In some embodiments, interconnects 1510 and 1530, although layered, may be similar in function (e.g., current distribution and fusing) and form (e.g., branched thick regions and thin link structures) to illustrative pressed interconnects 710 and 730 of FIG. 7. Accordingly, pressing techniques (e.g., in the context of FIGS. 4-11) and layering techniques (e.g., in the context of FIGS. 12-16) are illustrative techniques for forming interconnects having desired properties.

Figure 16:
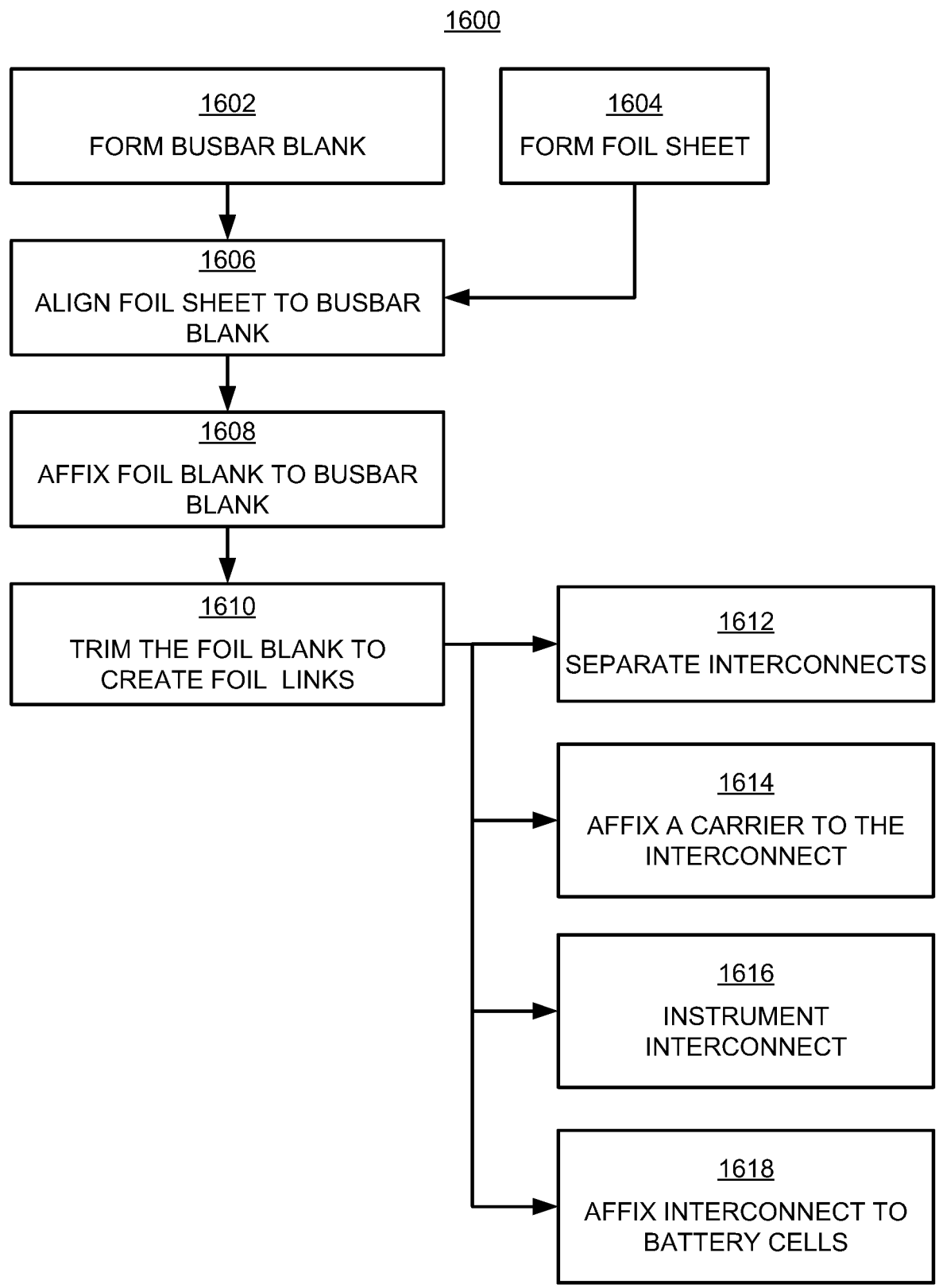
FIG. 16 shows a flowchart of an illustrative process for forming a battery interconnect by adjoining two layers, in accordance with some embodiments of the present disclosure.

FIG. 16 shows a flowchart of illustrative process 1600 for forming a battery interconnect by adjoining two layers, in accordance with some embodiments of the present disclosure.

Step 1602 includes forming a busbar blank. In some embodiments, a busbar blank is formed by machining (e.g., milling, drilling, grinding, or a combination thereof) a metal plate billet. In some embodiments, a busbar blank is formed by water-jet cutting, laser cutting, or plasma cutting a metal plate billet. In some embodiments, a busbar blank is formed using electrical discharge machining (e.g., wire EDM). In some embodiments, a busbar bank is formed by stamping a metal plate using a suitable die to trim away regions desired to be open. In some embodiments, a busbar bank is formed by punching a metal plate using a turret punch press (e.g., automated or manual). In some embodiments, forming a busbar blank includes forming large-scale features including for example, current-carrying regions and branching regions. A busbar blank may resemble an interconnect but need not. For example, a busbar blank may include more than one interconnect, arranged as a single part, and connected by regions intended for removal at a later processing step.

Step 1604 includes forming a foil sheet. In some embodiments, a foil sheet is formed by stamping or cutting a section of a larger foil sheet. In some embodiments, a metal billet (e.g., a plate, bar or other billet) is pressed flat until it has a thickness suitable for affixing to battery cells and forming a fusible link. The foil sheet need not include any through features such as holes, slots, or cutouts to reduce the risk of damage. Further, the foil sheet may include an outer perimeter that matches or roughly matches the outer perimeter of a busbar blank. In some embodiments, more than one foil sheet may be applied to a busbar blank. For example, rather than a single large foil sheet that is the same size as a busbar blank, several strips of foil may be formed, wherein the strips when arranged adjacent to one another have a similar shape to the busbar blank. In some embodiments, step 1604 may be omitted. For example, the foil sheet need not be trimmed prior to affixing to the busbar blank, and accordingly the foil sheet may be trimmed along the outer edge of the busbar blank after affixing.

The foil sheet and busbar blank may include the same material or different materials. For example, in some embodiments, the foil sheet may include aluminum, nickel, or stainless steel, while the busbar blank may include copper, aluminum, or any other suitable conductor (e.g., copper 110, copper 101, aluminum 1100, and/or aluminum 6101 to illustrate). In an illustrative example, aluminum is a suitable material for the foil sheet because it is well-suited for fusing. In a further illustrative example, copper has relatively high electrical conductivity and therefore could be included as a busbar blank having a relatively smaller thickness than an aluminum busbar blank (e.g., in circumstances where there exists space constraints). Any suitable material may be used as a foil sheet or busbar blank, in accordance with the present disclosure. In some embodiments, a foil sheet material has a relatively low melting point, making it suitable to act as a fuse (e.g., as a fusible link). In some embodiments, the foil sheet material and the busbar blank material are selected to have similar, or otherwise compatible, coefficients of thermal expansion.

Step 1606 includes aligning the foil sheet to the busbar blank. In some embodiments, the foil sheet includes a similar outer shape as the busbar blank and accordingly may be aligned to the busbar blank at the outer edges. In some embodiments, the foil sheet, the busbar blank, or both include a reference marking to aid in alignment. Step 1606 may include aligning the foil sheet and the busbar blank in plane (e.g., along either or both directions of the interface plane), normal to the plane (e.g., normal to the surface of the foil sheet), or both. In some embodiments, step 1606 includes laying the foil sheet onto the top or bottom of the busbar blank.

Step 1608 includes affixing the foil blank to the busbar blank. In some embodiments, step 1608 includes ultrasonic welding (e.g., ultrasonic roll welding). In some embodiments, step 1608 includes laser welding (e.g., laser welding at a plurality of locations). In some embodiments, step 1608 includes brazing or soldering the foil sheet to the busbar blank. In some embodiments, a combination of techniques may be used to affix the foil blank to the busbar blank.

Step 1610 includes trimming the foil blank to form foil links. In some embodiment, step 1610 includes stamping, progressing stamping, punching, or other suitable techniques to remove foil material. In some embodiments, step 1610 includes trimming the foil at the outer perimeter of the busbar blank (e.g., when the foil sheet is larger than the busbar blank, or when the foil sheet is untrimmed prior). Step 1610 includes forming links, fusible links, and optional instrumentation features. In some embodiments, some foil remains that is not covered by the busbar blank nor is included in a link or fusible link. For example, step 1610 may include stamping the links and fusible links, and some foil material may remain that is uncovered by the busbar blank. In an illustrative example, step 1610 may include removing sufficient foil material such that electrical shorting is not likely between a battery cell terminal, a link, and other nearby metal at a potential difference (e.g., by removing foil other than links in the proximity of battery terminals).

In an illustrative example, the affixed foil sheet and busbar assembly is arranged at a stamping tool configured to cut out and form-to-shape all of the tabs in the foil layer (i.e., the links) that will be connected to the battery cell terminals. The stamping tool may also be configured to cut the assembly into the intended number of interconnects.

Steps 1612-1618 (e.g., which may be the same as, or similar to, respective steps 1108-1114 of FIG. 11) may be applied to layered interconnects as well. For example, layered interconnects may be separated at step 1612 (e.g., similar to step 1108), layered interconnects may be affixed to a carrier at step 1614 (e.g., similar to step 1110), layered interconnects may be instrumented at step 1616 (e.g., similar to step 1112), and layer interconnects may be affixed to suitable battery cells at step 1618 (e.g., similar to step 1114).

In an illustrative example of step 1614, a reusable or disposable carrier may be configured to hold all of the induvial interconnects in alignment for transport and installation onto the battery module. The carrier and interconnects assembly may be attached to a battery module with fasteners or adhesive, for example. The carrier fixture may then be removed after the fasteners are installed or adhesive is cured, thus holding the interconnects in place when the carrier is removed.

During processing, a group of interconnects (e.g., intended for a battery module) may be a single rigid piece before separation. Upon separation, the interconnects, which include relatively small features such as links, may be susceptible to damage during storage, transport, and installation in a battery module. In order to reduce the risk of damage, and maintain alignment, a carrier system may be used. The carrier system functions to maintain alignment (e.g., a relative position) of the interconnects, and protect the small-length scale features (e.g., links) from being damaged. In some circumstances, it is easier to handle and perform as many processing steps as possible on a single larger work piece (e.g., including all of the interconnects for a battery module) until the work piece needs to be separated into individual components (e.g., individual interconnects). A carrier is configured to hold and maintain aligned interconnects, after separation of the interconnects (e.g., when their relative position is no longer constrained), until they are affixed to the battery cells, after which the carrier can be removed. For example, in some embodiments, a carrier includes a relatively simple adhesive-backed, plastic carrier (e.g., similar to a thick sticker and having suitable stiffness). In a further example, the carrier may be disposable.

Figure 17:
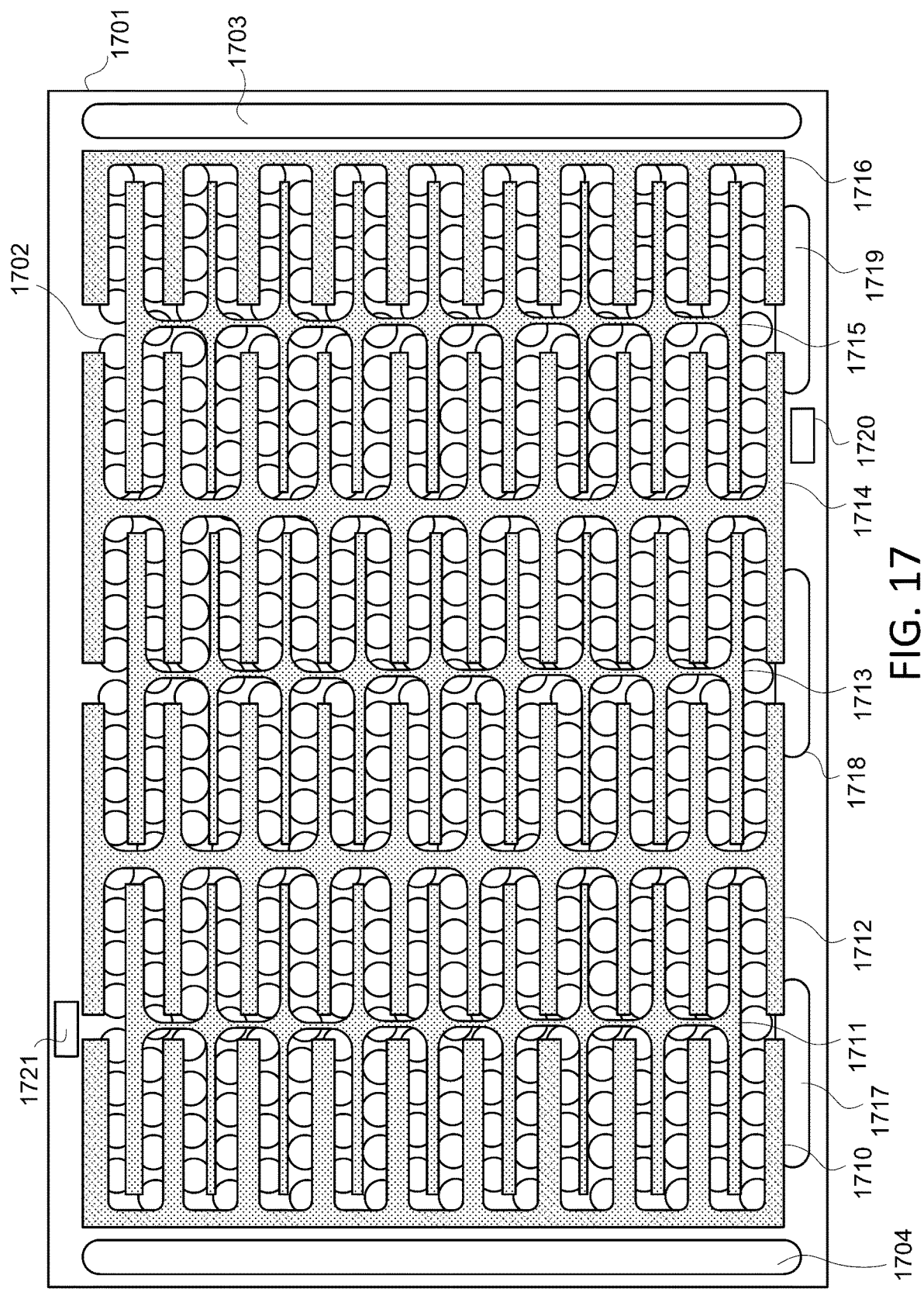
FIG. 17 shows a bottom view of an illustrative carrier affixed to a plurality of battery interconnects, in accordance with some embodiments of the present disclosure.
Figure 18:
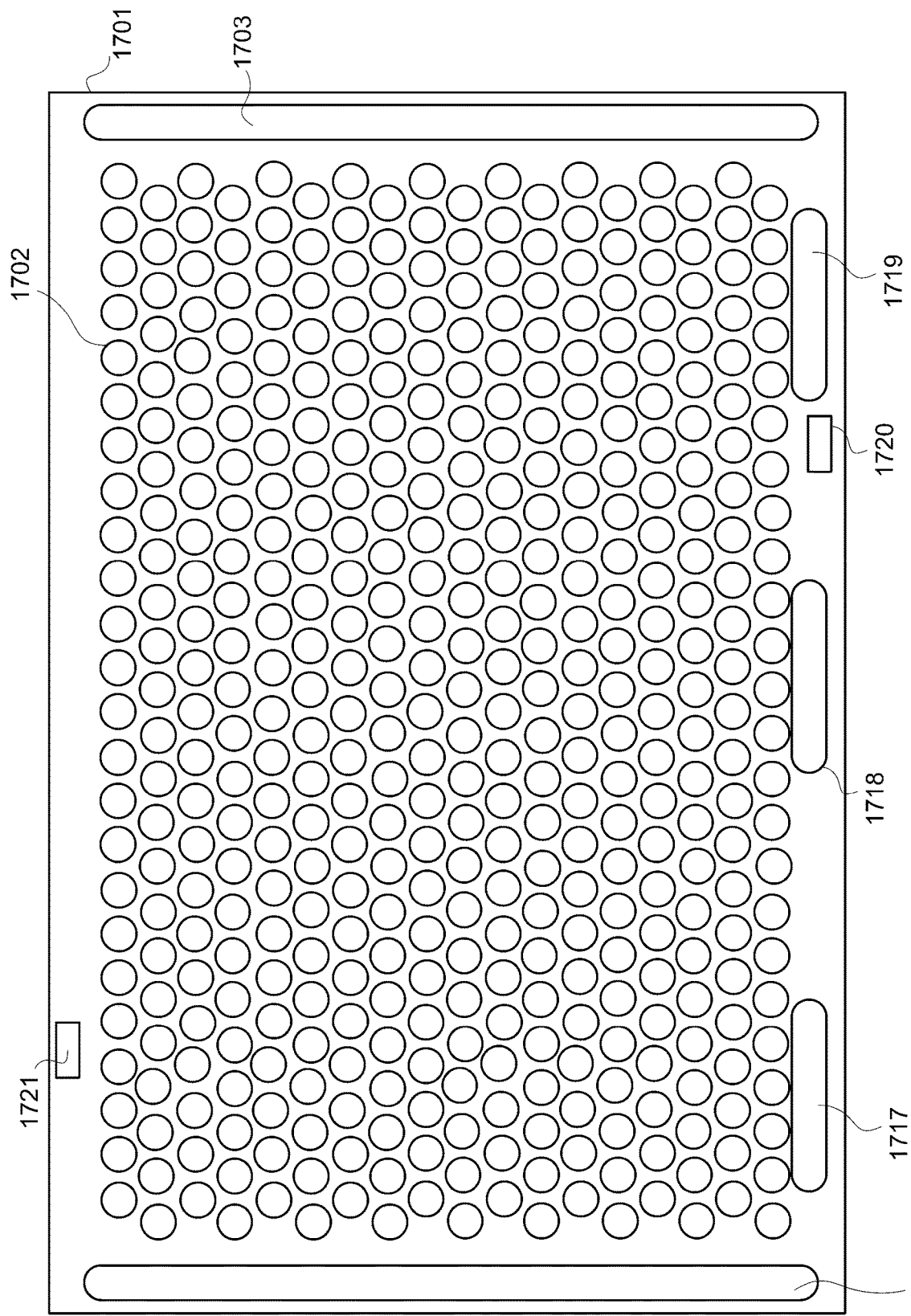
FIG. 18 shows a bottom view of the illustrative carrier of FIG. 17, without interconnects affixed, in accordance with some embodiments of the present disclosure.

FIG. 17 shows a bottom view of illustrative carrier 1701 affixed to battery interconnects 1710-1716, in accordance with some embodiments of the present disclosure. FIG. 18 shows a bottom view of illustrative carrier 1701 of FIG. 17, without the interconnects affixed, in accordance with some embodiments of the present disclosure. It will be understood that although links are not shown explicitly in FIG. 17 for clarity, interconnects 1710-1716 includes suitable links (e.g., fusible and non-fusible), formed using any of the illustrative processes disclosed herein.

In some embodiments, as illustrated in FIG. 17, carrier 1701 is affixed to interconnects 1710-1716, thus maintaining a relative position of interconnects 1710-1716 (e.g., the relative position desired when installed in a battery system). Illustrative carrier 1701 includes handles 1703 and 1704, access holes 1702, wire management features 1717, 1718, and 1719, and locating features 1720 and 1721. As illustrated in FIGS. 17-18, access holes 1702 are arranged similar to an arrangement of battery cells to which interconnects 1710-1716 are to be affixed. In some embodiments, fewer, larger openings are included in place of access holes 1702. Access holes may include any suitable shape and size of through recess configured to allow through access for affixing interconnects to battery cells. Wire management features 1717, 1718, and 1719 are slots, as illustrated in FIGS. 17-18. Wire management features 1717-1719 may be configured to route wires (e.g., instrumentation wires such as voltage taps), secure wires during welding, or otherwise manage wires which may be present during installation. Handles 1703 and 1704 are configured to allow transport of the carrier-interconnects assembly. Locating features 1720 and 1721 are configured to be used for alignment of carrier 1701 to a plurality of battery cells, a battery module, or any other suitable reference. For example, locating features 1721 may include circular holds, rectangular holes, slots, bosses, pins, fasteners, any other suitable recess or extension, or any combination thereof, which may aid in positioning carrier 1701 and affixed interconnects 1710-1716. In some embodiments, any or all of wire management features 1717, 1718, or 1719 may be omitted. In some embodiments, either or both of handles 1703 and 1704 may be omitted. In some embodiments, either or both of locating features 1720 and 1721 may be omitted. Any suitable number and type of handle, locating feature, wire management feature, and access holes may be included, and may include any suitable properties, in accordance with the present disclosure.

Carrier 1701 may include any suitable material such as, for example, plastic, rubber, metal, wood, any other suitable material, or any combination thereof. In some embodiments, carrier 1701 may include a single material arranged in a single layer. In some embodiments, carrier 1701 includes more than one layer, wherein each layer includes the same or different materials. For example, in some embodiments, a carrier may include a relatively stiff layer configured to maintain the shape of carrier 1701 and a relatively soft material for interfacing to interconnects (e.g., to prevent damage).

To illustrate, interconnects 710 and 730, which have been fully formed (e.g., via process 1100 of FIG. 11), include links 711, 731, and 733. Links 711, 731, and 733 are relatively thin (e.g., much thinner than busbars 412 and 432), and handling of interconnects 710 and 730 may risk damage to the links. Further, placement of interconnects in a battery module for connecting to battery cells may introduce further risk of damage, misalignment, or both. A carrier may be affixed to interconnects 710 and 730 after formation to protect the pressed links. For example, step 1110 of FIG. 11 may be performed immediately after step 1108 of FIG. 11. The carrier is affixed after separation, thereby providing a means to maintain alignment and prepare for application of the interconnects to battery cells. After the pressed links are affixed to suitable battery cell terminals (e.g., laser welded), the interconnect is fastened to the battery module (e.g., via threaded fasteners, crimps, clamps, or any other securement), or both, the carrier may then be removed. For example, the carrier may provide a temporary and interim function in maintaining alignment and preventing damage between processing and installation of interconnects.

To further illustrate, interconnects 1510 and 1530, which have been fully formed (e.g., via process 1600 of FIG. 16), include links 1411, 1431, and 1433. Links 1411, 1431, and 1433 are relatively thin (e.g., the foil is much thinner than busbars 1512 and 1532), and handling of interconnects 1510 and 1530 may risk damage to the links. Further, placement of interconnects in a battery module for connecting to battery cells may introduce further risk of damage, misalignment, or both. A carrier may be affixed to interconnects 1510 and 1530 after formation to protect the foil links. For example, step 1614 of FIG. 16 may be performed immediately after step 1612 of FIG. 16. The carrier is affixed after separation, thereby providing a means to maintain alignment and prepare for application of the interconnects to battery cells. After the foil links are affixed to suitable battery cell terminals (e.g., laser welded), the interconnect is fastened to the battery module (e.g., via threaded fasteners, crimps, clamps, or any other securement), or both, the carrier may then be removed. For example, the carrier may provide a temporary and interim function in maintaining alignment and preventing damage between processing and installation of interconnects.

The illustrative techniques of the present disclosure may provide for, for example, improved connection success rate requiring less rework. For example, in many instances, laser welding has higher yield than wire bonding. Further, the illustrative techniques of the present disclosure may provide for, for example, increased production speed. For example, laser welding is much faster than wire bonding. Further, the illustrative techniques of the present disclosure may provide for, for example, a lower total cost for production. For example, the cost per output rate is lower for laser welding than wire bonding. Further, the illustrative techniques of the present disclosure may provide for, for example, individualized fusing currents. For example, a stamped busbar can have individually tailored fuse dimensions, whereas wire bonding typically uses a fixed-diameter wire.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A battery system comprising:
   a carrier comprising a plurality of openings corresponding to a plurality of terminal ends of a plurality of battery cells; and
   a conductive material comprising a plurality of tabs that extend from a current collector, wherein:
      the current collector is attached to the carrier, and
      the plurality of tabs extend into the plurality of openings to contact the plurality of terminal ends of the plurality of battery cells.

2. The battery system of claim 1, wherein:
   each of the plurality of openings corresponds to a position of a respective terminal end of a battery cell of a plurality of battery cells; and
   each tab of the plurality of tabs extends into a respective opening of the plurality of openings to contact each respective terminal end of the plurality of battery cells.

3. The battery system of claim 1, wherein positive and negative terminal ends of each of the battery cells are located on a same end of each respective battery cell.

4. The battery system of claim 1, wherein the current collector is removably attached to the carrier.

5. The battery system of claim 1, wherein the conductive material comprises a continuous foil sheet.

6. The battery system of claim 1, wherein:
   the plurality of tabs comprises a first plurality of tabs and a second plurality of tabs;
   the first plurality of tabs extend to corresponding terminal ends having a first polarity of a first plurality of battery cells of the plurality of battery cells; and
   the second plurality of tabs extend to corresponding terminal ends having a second polarity of a second plurality of battery cells of the plurality of battery cells.

7. The battery system of claim 1, wherein:
   the current collector comprises one or more branches; and
   at least one of the plurality of tabs extends from the one or more branches.

8. The battery system of claim 1, wherein the conductive material is stamped to form the plurality of tabs.

9. The battery system of claim 1, wherein at least one of the plurality of tabs comprises a notch.

10. The battery system of claim 1, wherein an interface between the current collector and the conductive material comprises a planar shape.

11. A layered battery interconnect comprising:
   a carrier layer comprising a plurality of openings corresponding to a plurality of terminal ends of a plurality of battery cells;
   a first conductive layer comprising a plurality of tabs that extend from a current collector;
   a second conductive layer is attached to the carrier layer; and
   the plurality of tabs extend into the plurality of openings to contact the plurality of terminal ends of the plurality of battery cells.

12. The layered battery interconnect of claim 11, wherein the second conductive layer has a thickness greater than a thickness of the first conductive layer.

13. The layered battery interconnect of claim 11, wherein:
   each of the plurality of openings corresponds to a position of a respective terminal end of a battery cell of a plurality of battery cells; and
   each tab of the plurality of tabs extends into a respective opening of the plurality of openings to contact each respective terminal end of the plurality of battery cells.

14. The layered battery interconnect of claim 11, wherein positive and negative terminal ends of each of the battery cells are located on a same end of each respective battery cell.

15. The layered battery interconnect of claim 11, wherein the current collector is removably attached to the carrier layer.

16. The layered battery interconnect of claim 11, wherein:
   the plurality of tabs comprises a first plurality of tabs and a second plurality of tabs;
   the first plurality of tabs extend to corresponding terminal ends having a first polarity of a first plurality of battery cells of the plurality of battery cells; and
   the second plurality of tabs extend to corresponding terminal ends having a second polarity of a second plurality of battery cells of the plurality of battery cells.

17. The layered battery interconnect of claim 11, wherein each of the first conductive layer and the second conductive layer is stamped to form the plurality of tabs.

18. The layered battery interconnect of claim 11, wherein at least one of the plurality of tabs comprises a notch.

19. The layered battery interconnect of claim 11, wherein an interface between the current collector and the first conductive layer comprises a planar shape.

20. A method for creating a battery interconnect system, the method comprising:
- cutting a layered interconnect blank to form a plurality of tabs extending from a current collector;
- coupling a carrier layer to the current collector such that each tab of the plurality of tabs extend into a respective opening of a plurality of openings in the carrier layer; and
- coupling each tab of the plurality of tabs to a respective terminal end of a plurality of battery cells.

\* \* \* \* \*